United States Patent
Gilman et al.

(10) Patent No.: US 6,473,199 B1
(45) Date of Patent: Oct. 29, 2002

(54) CORRECTING EXPOSURE AND TONE SCALE OF DIGITAL IMAGES CAPTURED BY AN IMAGE CAPTURE DEVICE

(75) Inventors: Paul B. Gilman, Penfield; Barbara L. Grady, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/215,733

(22) Filed: Dec. 18, 1998

(51) Int. Cl.$^7$ ............................................. G06K 15/00
(52) U.S. Cl. ........................................ 358/1.9; 358/518
(58) Field of Search ............................... 358/518, 520, 358/521, 1.9, 530

(56) References Cited

U.S. PATENT DOCUMENTS

| | | | |
|---|---|---|---|
| 4,792,518 A | | 12/1988 | Kuwashima et al. ......... 430/505 |
| 4,806,986 A | * | 2/1989 | Tokuda ......................... 355/38 |
| 5,300,381 A | | 4/1994 | Buhr et al. .................... 430/30 |
| 5,521,723 A | * | 5/1996 | Madden ....................... 358/501 |
| 5,528,339 A | | 6/1996 | Buhr et al. ................... 355/32 |
| 5,840,470 A | * | 11/1998 | Bohan ......................... 430/359 |
| 5,920,680 A | * | 7/1999 | Inoue .......................... 395/101 |
| 5,930,002 A | * | 7/1999 | Haneda ....................... 358/300 |

OTHER PUBLICATIONS

"The Tone Reproduction of Colour Photographic Materials," R.W.G. Hunt, I.T. Pitt, and P.C. Ward, J. Photog. Sci., 17:198 (1969).

* cited by examiner

Primary Examiner—Jerome Grant, II
(74) Attorney, Agent, or Firm—Raymond L. Owens

(57) ABSTRACT

A method for correcting for exposure in a digital image which was captured by an image capture device and which is to be printed on a printer which forms monochrome or color images, on a medium, includes providing a plurality of exposure and tone scale correcting nonlinear transforms, each such nonlinear transform being unique to an exposure condition and which corrects exposure and tone scale for a digital image captured by the capture device for such unique exposure conditions and to be printed by the printer; and selecting the appropriate nonlinear transform from the plurality of nonlinear transforms and using such selected transform to transform the digital image and produce a new digital image which is corrected for exposure and tone scale when printed from the printer.

8 Claims, 6 Drawing Sheets

CORRECTING EXPOSURE AND TONE SCALE OF DIGITAL IMAGES CAPTURED BY AN IMAGE CAPTURE DEVICE

FIELD OF THE INVENTION

This invention relates to a method of providing improved prints (images on media) by a printer from images captured by a capture device over a wide variety of exposure conditions.

BACKGROUND OF THE INVENTION

It is important in producing displays or prints from digital images to fit the dynamic range of the originally captured scene to the dynamic range of the materials available for displaying or printing using the best possible transform. A limiting factor is the dynamic range of the materials available for displaying or printing. By selectively choosing the proper transform for displaying or printing, it is possible to display or print aesthetically pleasing images on materials that have less dynamic range than the original scene.

As new materials such as thermal print media and ink jet technologies have become available for printing, they have introduced a larger dynamic range than available with previous technologies. It is well known how to print digital images on these types of media. However, it is difficult to design different transforms that best take advantage of these new media. A key element in any new transform is to be able to utilize the full dynamic range of the media for displaying or printing the digital images.

There have been a number of techniques for improving the tone scale of digital images, see for example, U.S. Pat. No. 4,792,518 and U.S. Pat. No. 5,300,381. For a discussion of tone scale, see "The Tone Reproduction of Colour Photographic Materials," R. W. G. Hunt, I. T. Pitt, and P. C. Ward, J. Photog. Sci., 17:198(1969).

As set forth in the above disclosures, the techniques for making the images are very complex and require that the media be photographic media. The publication by Hunt et al describes the "ideal system" for printing photographic images to correct for camera flare, printer flare, and viewing flare but offers no practical way to implement this theoretical tone reproduction curve because of the lack of digital imaging tools and the limitations of the materials available in 1969.

U.S. Pat. No. 5,528,339 discloses techniques for improving the tone reproduction of digital images on other media such as thermal, ink jet and electrophotographic. However, the media available for the printing of the digital images far exceeds the dynamic range previously described by having lower minimum densities and considerably higher maximum densities.

Heretofore, in digital image processing, each image is processed separately. By that is meant the scene is calibrated and individually tone scaled for that one image. This, of course, is a time consuming process and is a major drawback in the use of digital images captured by a typical consumer. This is especially true when it is realized that a typical amateur photographer (using film or digital cameras) captures images over a wide photographic space and under different exposure conditions which result in images which may be either under or over exposed compared to a normal exposure.

Digital images are often stored in a "rendered" image space, such as sRGB a default RGB color space, where the relationship between the image code values and the scene luminance values is very non-linear. These images may contain exposure and tone scale errors, where the key objects are lighter or darker than desired by the user, due to imperfect exposure determination algorithms in the digital camera or film scanner which created the digital image. Many imaging applications, such as Adobe Photoshop or Kodak Picture Easy, allow the user to adjust the "brightness", "contrast", and/or "gamma" of the image by sliding using one or more "sliders" controlled by a mouse. The controls adjust the slope, x-intercept, or exponential function of a look-up table that is applied to the image, in order to modify the tone scale of the image when it is displayed or printed. However, because they do not directly adjust the scene exposure, they do not properly compensate for camera exposure or tone scale errors. While it is possible to somewhat improve the image using such controls, this is extremely difficult for unskilled users to determine how to best set these multiple controls.

What is needed is a method that provides proper compensation for camera exposure and tone scale errors which is extremely simple for a non-expert user to understand and utilize.

SUMMARY OF THE INVENTION

It is an object of the present invention to facilitate the printing of over and under exposed digital images captured by a capture device over a wide exposure range and which are to be printed by a printer to provide images with improved exposure and tone scale to provide prints with improved exposure correction and improved tone scale.

It is another object of the present invention to facilitate the use of digital image processing by users, reducing their time to produce high quality images.

These objects are achieved by a method for correcting for exposure in a digital image which was captured by an image capture device and which is to be printed on a printer which forms monochrome or color images, on a medium, comprising the steps of:

a) providing a plurality of exposure and tone scale correcting transforms, each such transform being unique to an exposure condition and which corrects exposure and tone scale for a digital image captured by the capture device for such unique exposure conditions and to be printed by the printer; and b) selecting the appropriate transform from the plurality of transforms and using such selected transform to transform the digital image and produce a new digital image which is corrected for exposure and tone scale when printed from the printer.

ADVANTAGES

It is an advantage of the present invention to provide an improved print that takes into consideration the operating characteristics of the capture device and the printer and corrects for exposure and tone scale by using a plurality of predetermined transforms which a user can readily choose to transform a digital image from a predetermined capture device and apply such transformed image to a printer to provide an aesthetically pleasing print.

It is also a feature of the invention that color correction can readily be accomplished by using color management techniques on a transformed digital image prior to printing. This technique can be readily implemented in a computing system. Such a computing system can include a microprocessor which can apply tone scale and exposure correction transforms which allows a printer to produce continuous tone prints which are aesthetically pleasing.

DETAILED DESCRIPTION OF THE INVENTION

Print media, such as, but not limited to, thermal print and ink jet receivers, can produce images with a fairly wide dynamic range. The present invention makes it possible to produce a new transform which will produce tone scale curves that are capable of providing an even higher level of image quality than previously obtainable. As will be seen, it is very simple to implement these techniques to optimize tone scale curve adjustments. Although it is preferable to use nonlinear transforms, those skilled in the art will appreciate that mathematical transforms can also be used in accordance with the present invention that are unique to an exposure condition and which corrects exposure and tone scale for a digital image captured by the capture device for such unique exposure conditions and to be printed by the printer.

Image capture devices, in accordance with the present invention, can include digital cameras and scanners. Images that are captured, for example, on other origination sources (photographic paper, slides and negatives) can be converted to digital images by scanners. Printers, in accordance with the present invention, can be silver halide printers, thermal printers, ink jet printers, electrophotographic printers, and the like.

The present invention is applicable for printers which produce monochrome or colored prints on a medium. However, it is also applicable for displaying images on a display such as a cathode ray tube (CRT) monitor. Moreover, the present invention is also applicable for making monochrome or colored prints. By the term "monochrome" is meant black and white or a single color and white.

Figure 1:
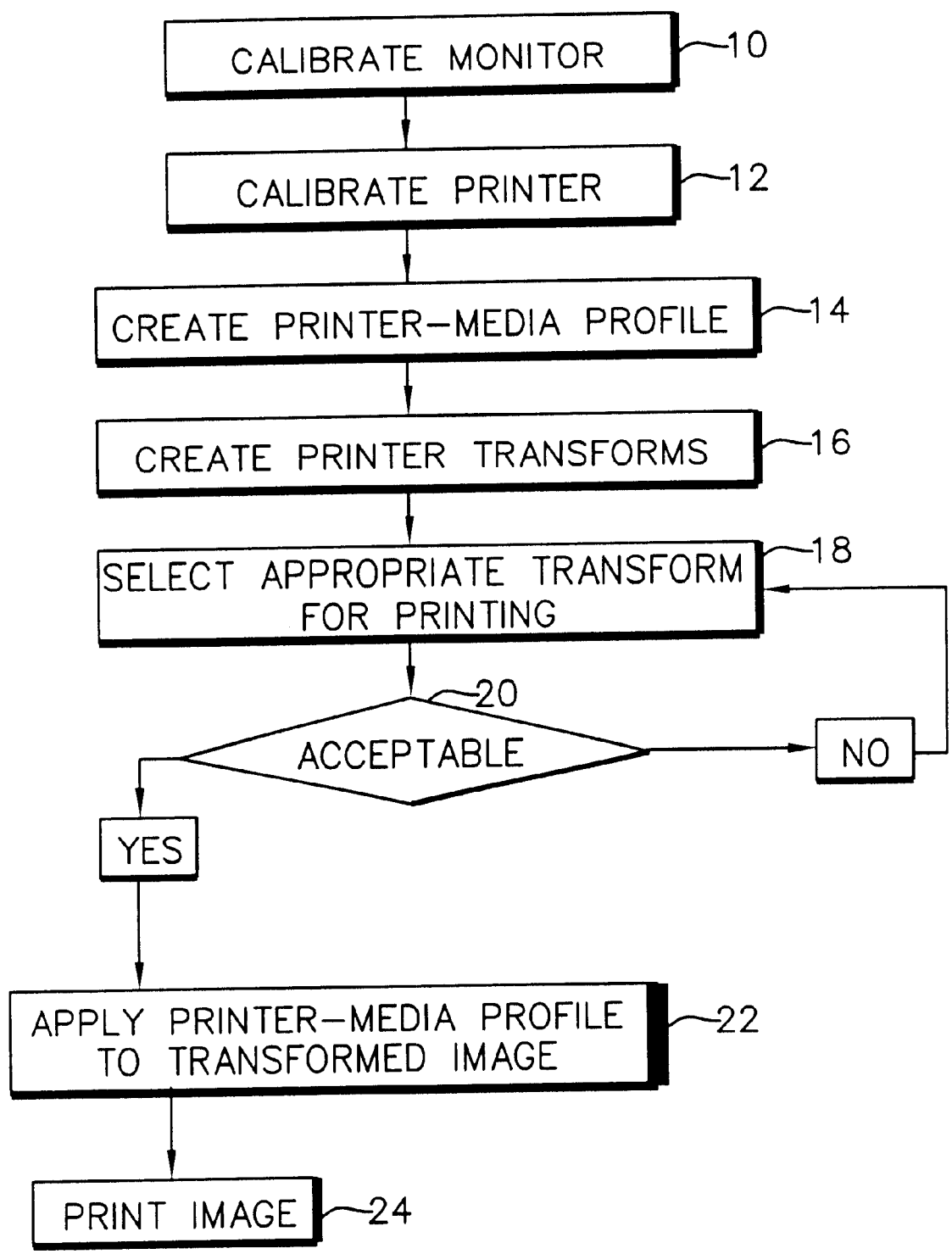
FIG. 1 is a flow chart of the process for both the open and closed system architectures in accordance with the present invention.

FIG. 1 is a flow chart of the process for both the open and closed system architectures in accordance with the present invention. The first step in the process involves calibrating the monitor 10. The printer is next calibrated 12 and a printer-media profile 14 (see step 3 of Example 1) is generated for the particular printer-media combination. Printer transforms 16 are generated for each of the exposures in the series of image captures. The appropriate transform is selected in block 18 and an image using such transform is viewed on a calibrated monitor 10. If this image is visually acceptable (see decision block 20), the transformed image is color corrected in block 22 and a print is made in block 24. However, if the monitor image is unacceptable, then the process is repeated by returning to block 18 where a different transform is selected. This iterative process continues until an optimized image is viewed on the calibrated monitor.

Figure 2A:
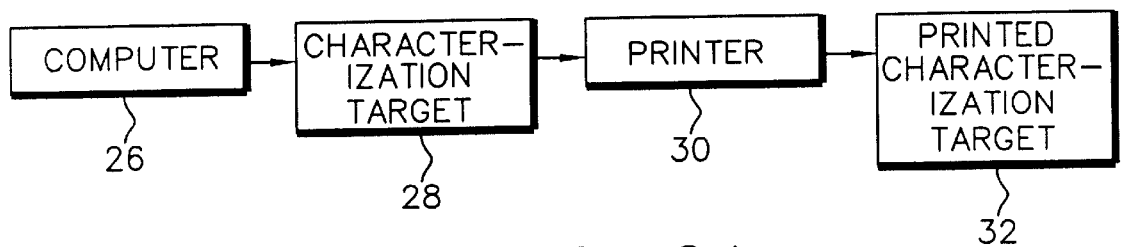
FIGS. 2A–B are block diagrams of a test setup for characterizing the printer-media in accordance with the present invention.
Figure 2B:
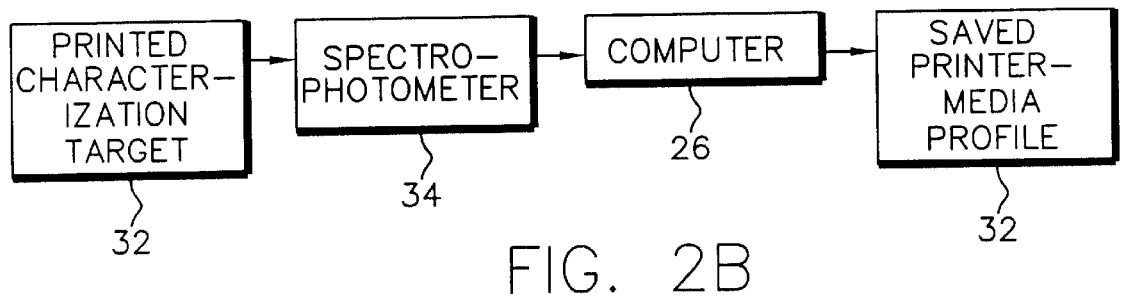

FIGS. 2A–B are block diagrams of a process that are presently used to produce a profile that characterizes a particular printer-media combination. A computer 26 is used to print a characterization target 28 consisting of color and monochrome patches. The printed characterization target 32 is then measured with a spectrophotometer 34 to obtain spectral data for each of the patches contained within the characterization target (see FIG. 2A). Using a computer 26 and proprietary software, a printer-media profile is generated that characterizes the printer-media combination. The printer-media profile 36 generated for the particular printer-media combination can then be saved for future use (see FIG. 2B).

Figure 3:
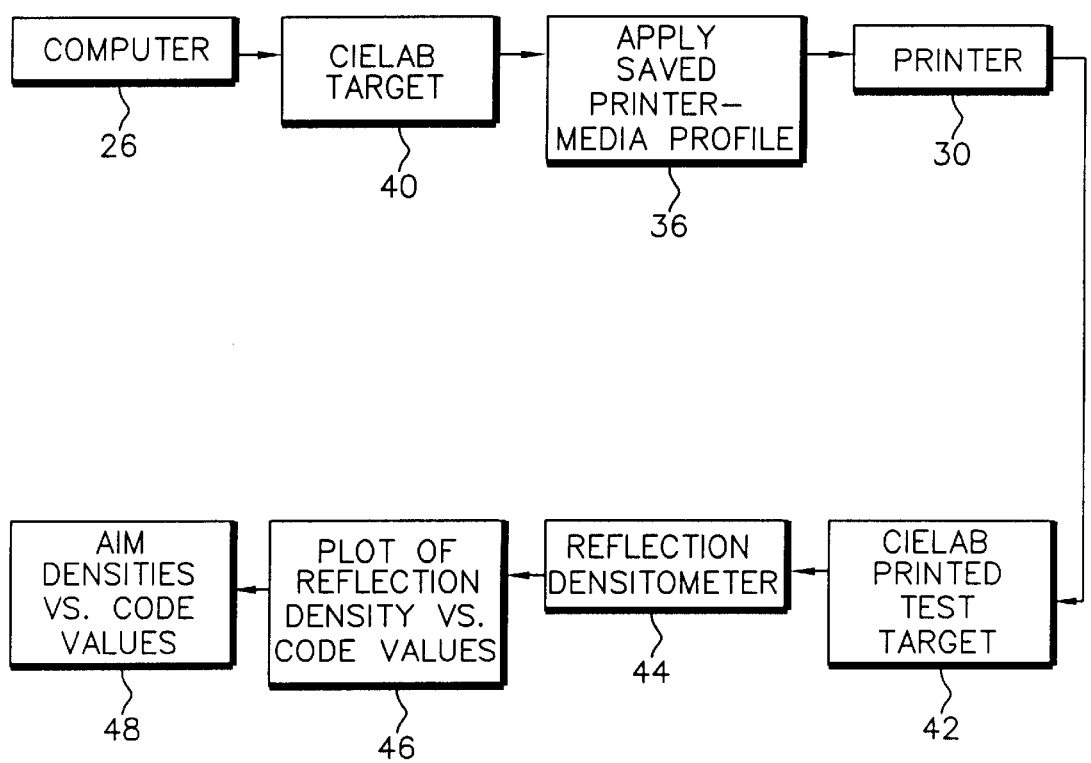
FIG. 3 is a block diagram for determining print aim densities vs. computer code values.

FIG. 3 is a block diagram for determining print aim densities vs. code values. A computer 26 is used to generate a CIELAB test target 40, process the data through the saved printer-media profile 36 and output the transformed CIELAB test target to a printer 30. The CIELAB printed test target 42 is then measured using a reflection densitometer 44 to create a plot of reflection density vs. code values 46. This allows the creation of a table of aim densities vs. code values 48 which are then used to create a printer transform 16 for each exposure.

Figure 4:
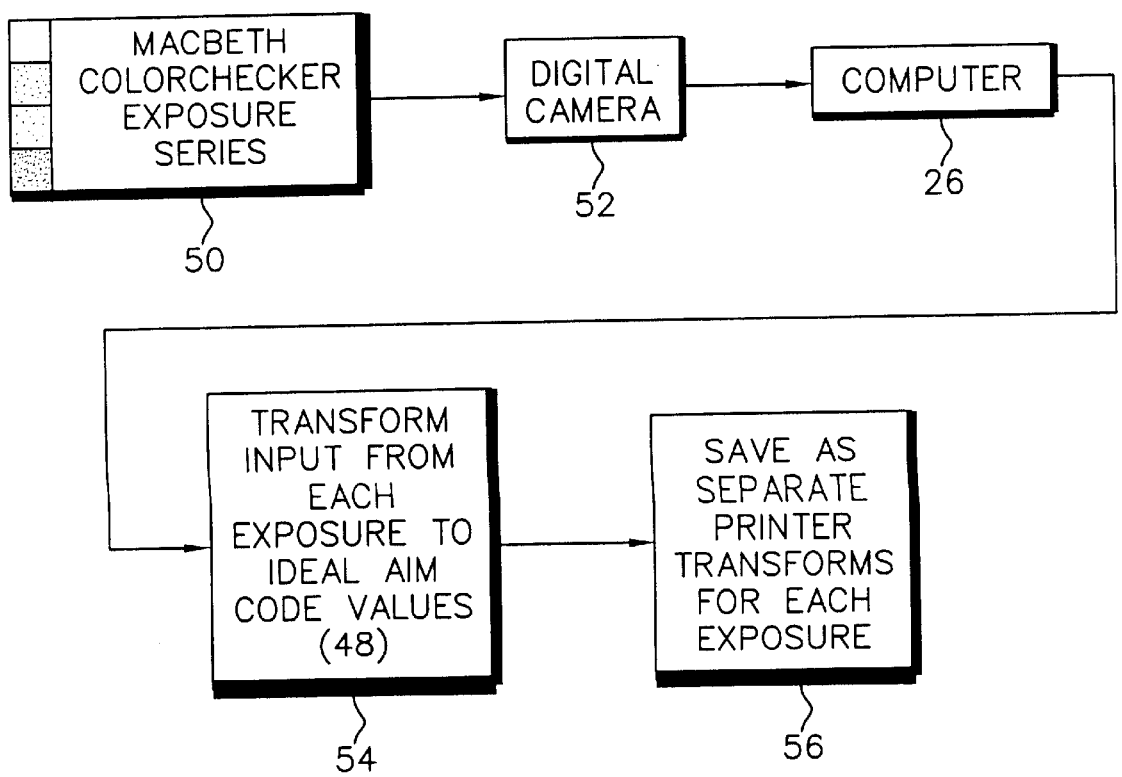
FIG. 4 is a block diagram for creating a printer transform.

FIG. 4 is a block diagram for creating a series of printer tone scale transforms. The image of the test chart 50 is captured by the digital image capture device 52 and transferred to a digital computer 26 where the average input color code values of each neutral patch of the test chart are measured using an image processing program such as Adobe Photoshop. These input code values are then digitally transformed to the aim output code values 54. A separate transform is constructed for each of the exposure conditions which may be saved as separate transforms 56 to correct a digital image for exposure and tone scale errors (see FIG. 4).

Figure 5:
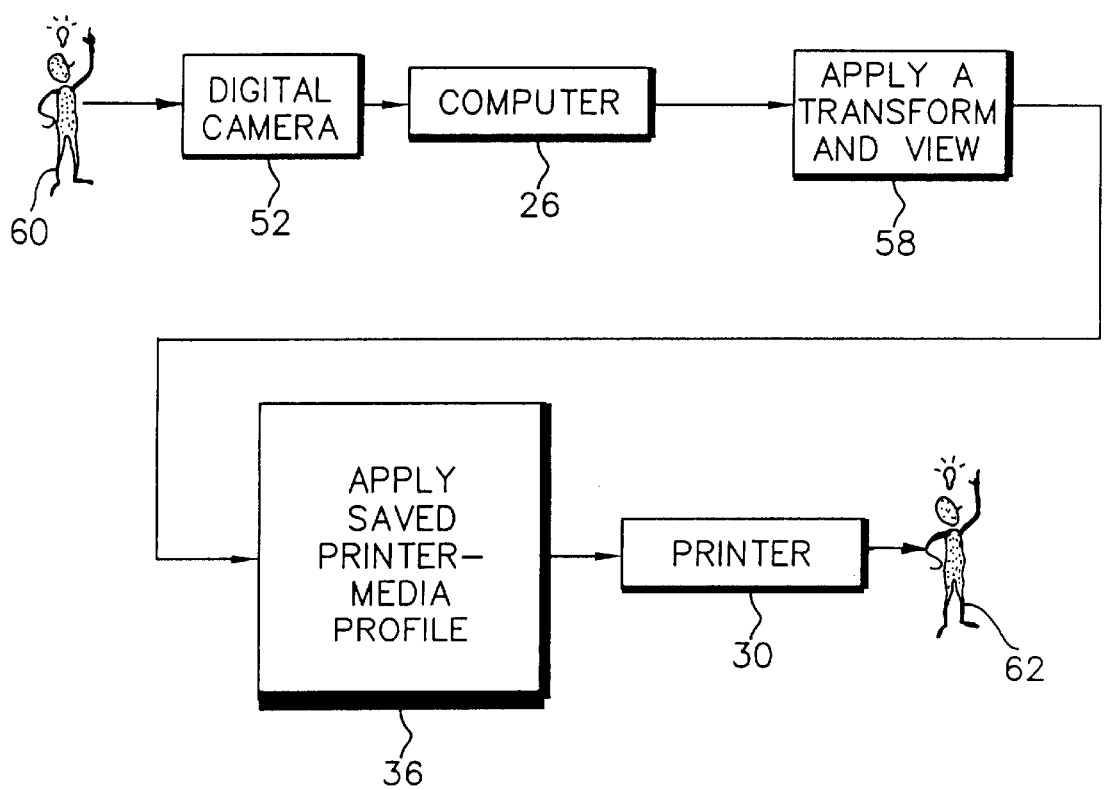
FIG. 5 is a block diagram for the application of exposure, tone scale, neutral balance and color reproduction corrections to produce an optimized image in accordance with the present invention.

FIG. 5 is a block diagram for the application of exposure, tone scale, neutral balance and color reproduction corrections in accordance with the present invention. A subject 60 is captured using an image capture device 52, such as a digital camera, and a digital image file of the subject is transferred to a computer 26. Using an image processing program such as Adobe Photoshop, a transform is applied to the image and viewed for acceptability 58. After an acceptable transform has been applied, the saved printer-media profile 36 is applied to the image and the image is output to the printer 30 to produce a final optimum image 62.

Figure 6A:
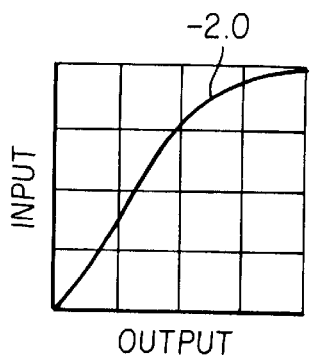
FIGS. 6A–I are examples of a plurality of representative printer transforms for a specific combination of a specific digital camera, and printer and media combination produced by FIG. 4 to correct for exposure and tone scale errors over a five-stop exposure range in accordance with the present invention.
Figure 6B:
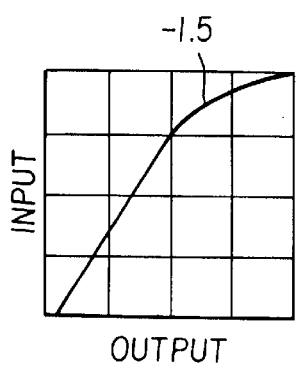
Figure 6C:
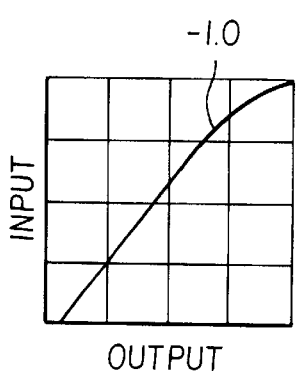
Figure 6D:
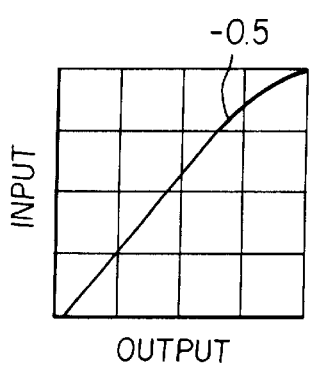
Figure 6E:
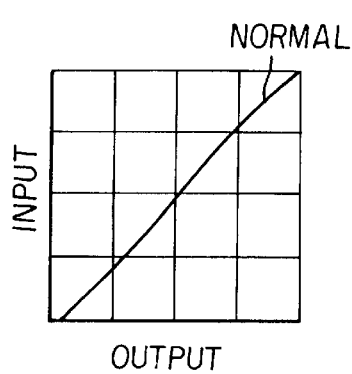
Figure 6F:
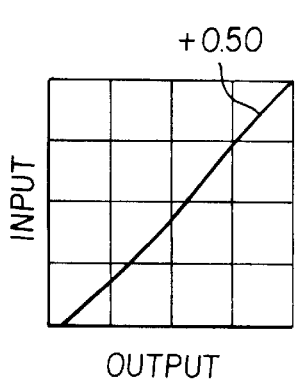
Figure 6G:
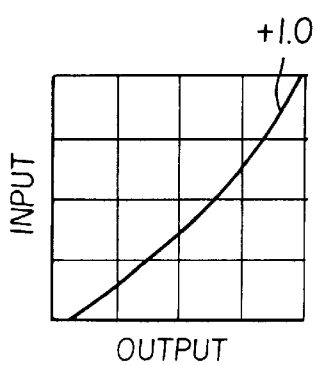
Figure 6H:
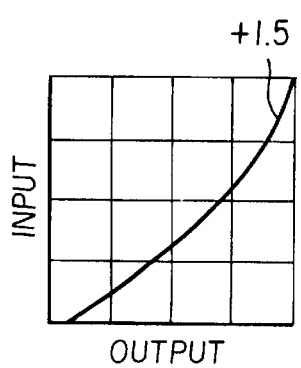
Figure 6I:
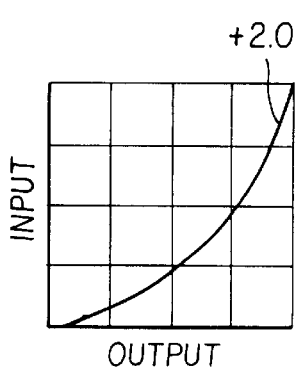

FIGS. 6A–I are examples of a plurality of representative printer transforms for a specific combination of a specific digital camera, and printer and media combination produced by FIG. 4 to correct for exposure and tone scale errors over a five-stop exposure range in accordance with the present invention. More specifically, a Kodak DC260 camera was used with a power Macintosh 6500/300 computer, used with an Epson Stylus Photo 700 ink jet printer using Canon HG201 glossy film. Progressively, in each FIG. 6A–6I, the illustrated transforms correct for exposure and tone scale errors over a five-stop exposure range from –2.0 to +2.0 stops in 0.5 stop increments. More specifically, FIG. 6A corresponds to a –2.0 stop under exposure and tone scale correction, whereas FIG. 6E is for a normal exposure, and FIG. 6I corresponds to a +2.0 stop over exposure and tone scale correction.

EXAMPLE 1

Open System Architecture

The following is an example for practicing the present invention. This example uses Microsoft PC Windows 95 or Macintosh Operating System (OS 8.0), Adobe Photoshop 5.0, and Kodak Professional ColorFlow Profile Editor Professional Color Management Tools which are software programs commercially available.

1. Set-Up to Provide Exposure and Tone Scale Correcting Nonlinear Transforms

In order to control the color management path in Adobe Photoshop 5.0 it is important to reset its Color Settings.

The procedure to do this when using Kodak ColorFlow is as follows:

A. The first step is to create a monitor profile for controlling the appearance of the viewing monitor.
  1) In PC WINDOWS 95 this is done by going to START-SETTINGS-CONTROL PANEL-ADOBE GAMMA and following the step-by-step procedure to set up the monitor. This procedure ends by saving what has been done as a monitor profile which will be used in the following set-ups.
  2) With a Macintosh system, the procedure is to go to the MAC APPLE-CONTROL PANEL-ADOBE GAMMA and follow the step-by-step procedure which results in a saved monitor profile to be used in the following set-ups.

B. Open Adobe Photoshop 5.0 and go to FILE-COLOR SETTINGS:
  1) RGB SET UP:
    a) RGB [Wide Gamut]
    b) GAMMA [2.2]
    c) WHITE POINT [5000K D50]
    d) PRIMARIES [700/525/450]
    e) Monitor [Profile created in Step 1]
    f) Display using monitor compensation [Check on]
    g) Preview [OFF]
  2) CMYK SET UP:
    a) ICC [Check on]
    b) PROFILE [Can be printer such as DS 8650]
    c) ENGINE [Kodak Digital Science ICC CMS]
    d) INTENT [Perceptual]
    e) BLACK POINT [OFF]
    f) PREVIEW [ON]
  3) GRAY SCALE BEHAVIOR:
    a) RGB [ON]
    b) PREVIEW [ON}
  4) PROFILE SET UP:
    a) EMBED PROFILES [Check on for all: RGB-CMYK-GRAYSCALE-LAB]
    b) ASUMED PROFILES: RGB [Wide gamut RGB]
    c) CMYK [None]
    d) GRAYSCALE [None]
    e) PROFILE MISMATCH HANDLING
      (i) RGB [Ask when opening]
      (ii) CMYK [Ask when opening]
      (iii) GRAYSCALE [Ask when opening]

2. Create a Tone Scale Calibration Test Target for the Printer

In Adobe Photoshop, go to FILE-NEW-LAB and create a set of one inch square patches in LAB values that vary in L* only, from 0–100 in 2–5 code value increments. A convenient way to do this is:
  A. Set the selection marquee to 1"×1", 300 ppi.
  B. Double-click the foreground patch and manually set the LAB value.
  C. Press the OPTION-DELETE keys to fill the marquee selected area with the LAB values specified.
  D. Make a set of at least 30 patches.
  E. SAVE the final test target as a LAB, TIFF file.

3. Create a Printer-media Profile Using Kodak ColorFlow Software for Improving Color Reproduction of the Final Print Follow the Kodak ColorFlow instructions for creating an ICC profile for the printer and paper of choice.

4. Create a Plurality of Exposure and Tone Scale Correcting Nonlinear Transforms A. Print the test target created in Step 2 (Create a tone scale calibration test target for the printer) using the following steps:
  1) Open the test target created in Step 2 (Create a tone scale calibration test target for the printer) in Adobe Photoshop. Make sure the test target is still in LAB color space by going to EMAGE-MODE.
  2) Send the test target to the printer by first going to WINDOWS-SHOW ACTIONS and navigate to the ACTION item that is: lab2rgb, press the arrow to run the ACTION. (The Kodak ColorFlow Action Items are loaded from the Kodak ColorFlow Production Tools Software.)
  3) Running the ACTION will prompt a user to specify a Source: pslabpcs.pf and Destination: the ColorFlow ICC Printer-media Profile created in Step 3 (Create a Printer-media Profile Using Kodak ColorFlow Software for Improving Color Reproduction of the Final Print).
  4) Once the conversion to printer RGB color space has been made, send the image to the printer using the standard printing procedures. Ensure that all possible color management controlled by the printer is turned off. This is because it is preferable to control the path from the computer image to the printer. In the Epson Stylus Photo 700 this is easily done by selecting ADVANCED MODE and then clicking on MORE SETTINGS. This brings up another dialog box in which the user can select NO COLOR ADJUSTEMENT in the Color Adjustment area.

B. Using a reflection densitometer, read the reflection densities of the printed LAB patches and create a table of reflection densities vs. L* values.

C. With a digital camera, photograph a scene with a Macbeth ColorChecker 6–10 feet away and make an exposure series. For example, an exposure series that varies from two stops under to two stops over in 1/2-stop increments. For the Kodak DC 260 camera it is convenient to do this in shaded daylight with fill flash on for all the exposures as this produced data that was the most useful for tone scaling real images captured later.

D. Open the images from the exposure series in Adobe Photoshop.

E. Convert the images to LAB color space by going to WINDOWS-SHOW ACTIONS.

F. Navigate to the ACTION: srgb2lab.

G. Click the arrow to run the ACTION.

H. At the prompt specify Source: Kodak srgb.pf and Destination: pslabpcs.pf.

I. Go to WINDOWS-INFO and using the marquee tool, measure the L* values of the six neutral steps of the Macbeth ColorChecker.

J. Make a table of the six steps and their L* values and call this the INPUT LAB values.

K. The aim reflection densities in a final print for the six neutral steps of the Macbeth ColorChecker should be:
Step 1—0.06
Step 2—0.18
Step 3—0.30
Step 4—0.65
Step 5—1.05
Step 6—1.70

L. From the table created in Step 4J (Create a plurality of exposure and tone scale correcting nonlinear transforms), select the L* values that correspond to the aim densities listed above, these will be the OUTPUT VALUES.

M. In Adobe Photoshop go to IMAGE-ADJUST-CURVES and construct an INPUT-OUTPUT transform using the input LAB values obtained for the measured values in the test image and the OUTPUT values derived from the aim densities in Step 4K (Create a plurality of exposure and tone scale correcting nonlinear transforms).

1) In Adobe Photoshop 5.0 this is easily done by clicking on a point on the line, then typing in the input and output values directly. This must be done for each of the six steps.

2) In Adobe Photoshop 4.0 the input/output points must be manually located then clicked to fix each of the six points.

N. When done, SAVE the resulting nonlinear transform in the Photoshop folder with a label such as −2.0 to indicate the stop correction that it will make.

O. Repeat Steps 4M–4N (Create Printer Transforms For The Camera of Choice) for each 1/2 stop exposure. Each nonlinear transform that is produced by this method is unique to an exposure condition and simultaneously corrects exposure and tone scale for printing the digital image captured by the capture device (such as a digital camera).

P. For convenience and to save time later, it is preferred to save each nonlinear transform as an Adobe Photoshop ACTION item on the keyboard so that an exposure and tone scale correction may be made with one simple keystroke over at least a +2.0 to −2.0 stop exposure range. An ACTION item is most easily created by going to WINDOWS-SHOW ACTIONS and clicking on the upper right arrow of the ACTIONS menu.

a) Click on NEW ACTION-and assign a name (such as −2.0) and a function key (such as F2).

b) Click RECORD and go through the following steps:
(i) IMAGE-ADJUST-CURVES-LOAD (navigate to Photoshop and click on the saved −2.0 transform, for example).
(ii) Click OK and click on the stop button in the bottom left-hand corner of the ACTIONS menu and all of these action steps are now saved as the keystroke F2.
(iii) Now pressing F2 in any Adobe Photoshop imaging session will exposure correct and tone scale an image that is two stops underexposed.
(iv) Repeat creating an ACTION item and saved keystroke for each of the 1/2 stop saved transforms created in Step 4P (Create a plurality of exposure and tone scale correcting nonlinear transforms).

Q. The last ACTION item is to convert the LAB image back to the specific printer/paper used. This is accomplished by going to WINDOWS-SHOW ACTIONS-NEW ACTION-Assign Function Button-RECORD-FILTER-Kodak ICC Conversion-SOURCE:pslabpcs.pf-DESTINATION:Profile for specific printer/paper combination-IMAGE-MODE-Multichannels-IMAGE-MODE-RGB-STOP BUTTON. This ACTION puts the image back into printer RGB and makes it ready for final printing.

5. Selecting the Appropriate Nonlinear Transform for Printing the Image

A. Open the saved digital image in Adobe Photoshop (in 5.0 if a prompt is presented, click [do not convert] because the user should control this step). Neutral balancing of images can be done by a number of different techniques known in the art. For a specific example of a neutral balancing technique, see Galbraith's website at http://www.robgalbraith.com/.

a) Open the image in Adobe Photoshop.
b) Goto IMAGE-ADJUST CURVES.
c) Double-click on the right-hand eyedropper.
d) Click on an area in the scene that should be neutral.
e) Modify the LAB values such that L* is unchanged and a*=b*=0 then click OK.
f) Click on the area that was selected in Step 4 and the entire scene will be neutral balanced to that point in the scene.

B. The images from most Kodak digital cameras will be in sRGB color space. To exposure correct and tone scale the image it should be converted to LAB color space where the tone scale calibration for the printer was done.

C. With an image on the monitor go to WINDOWS-ACTIONS, navigate on the ACTIONS menu and click on the ACTION: srgb2lab and click on the arrow to run this ACTION. The ACTION will prompt a user to enter SOURCE: Navigate to Color Profiles (for the Mac, open Macintosh HD-Select SYSTEM FOLDER-COLORSYNC PROFILES) (for the PC go to WINDOWS-SYSTEM-COLOR) and select the srgb.pf profile. (It may be useful to put this Folder on the Desktop for future reference and easy access). The DESTINATION is also found in the Color Profiles, select: pslabpcs.pf.

D. Click OK and the ICC conversion should take place.

E. A visual evaluation of the image on the monitor, which has been adjusted to be a good predictor of the final image, can now be made to determine if it is acceptable or unacceptable. The displayed image could be unacceptable because it is either too dark (underexposed) or too light (overexposed).

1) If the image looks acceptable (normal), press the Function key saved as an ACTION item that applies the normal transform. [As an example, the function keys may be set as follows. (F2=−2.0) (F3=−1.5) (F4=−1.0) (F5=−0.50) (F6=N) (F7=+0.50) (F8=+1.0) (F9=+1.5) (F10=+2.0)]

2) If the image on the monitor looks too dark, press one of the Function keys with a Negative (−) correction to improve the visual look.

3) If the image on the monitor looks too light, press one of the Function keys with a Positive (+) correction to improve the visual look.

4) If the appearance on the monitor is not acceptable, select EDIT-UNDO or Command Z (Mac) or Ctrl Z (PC).

F. At first, try a number of the Function keys followed by an UNDO until the visual effect that looks most pleasing is obtained on the calibrated monitor. If none of the Function key corrections look just right, apply the Function keystroke that gives the best look, then go to IMAGE-ADJUST-CURVES and click on the center point of the line and drag it up or down, left or right to make a minor adjustment to fine tune the final image.

6. Color Correcting the Transformed Digital Image

The following procedure permits a user to produce a new digital image, which is corrected for exposure, tone scale, neutral balance and color reproduction when printed on the selected printer.

A. To print the final image, it must have a printer-media profile applied. This is most easily done using the ACTION item: pslab2rgb. Click on it and click the arrow to run it.

B. The ACTION item will ask for a SOURCE which is: pslabpcs.pf and a DESTINATION which is: the printer-media ICC profile created using the Kodak ColorFlow software or one supplied with the printer by the manufacturer. At this point, Adobe Photoshop applies these two profiles to produce a corrected digital image for printing.

C. Send the converted image to the printer making sure that the color management of the printer is turned off.

7. Repeating the Process if the Print is Unacceptable

After the print is made and, in the event that it is unacceptably light or dark, repeat the procedures starting with Step 5 (Selecting the Appropriate Nonlinear Transform for Printing the Image) and select the appropriate Function key to correct for images that are too light or too dark.

The above Example 1 is for a device-independent set up for a global and open system in that the monitor set up, transforms, and profiles used on a particular system can be used on other systems with the same improved image quality for the particular printer and print media combination. Example 2, which follows, is a device-dependent technique for implementing exposure and tone scale corrections in accordance with the present invention, which is more for a closed system. By the use of the term "closed system" is meant a specific arrangement of computer, monitor, printer, and print media. An advantage of the Example 2 arrangement is that it often can be more convenient and takes less time to implement.

EXAMPLE 2

Closed System Architecture

1. Set-Up to Provide Exposure and Tone Scale Correcting Nonlinear Transforms

In order to control the color management path in Adobe Photoshop 5.0 it is important to reset its Color Settings.

The procedure to do this when using Kodak ColorFlow is as follows:

A. The first step is to create a monitor profile for controlling the appearance of the viewing monitor.

1) In PC WINDOWS 95 this is done by going to START-SETTINGS-CONTROL PANEL-ADOBE GAMMA and following the step-by-step procedure to set up the monitor. This procedure ends by saving what has been done as a monitor profile which will be used in the following set-ups.

2) With a Macintosh system, the procedure is to go to the MAC APPLE-CONTROL PANEL-ADOBE GAMMA and follow the step-by-step procedure which results in a saved monitor profile to be used in the following set-ups.

B. Open Adobe Photoshop 5.0 and go to FILE-COLOR SETTINGS:

1) RGB SET UP:
a) RGB
b) GAMMA [1.8]
c) WHITE POINT [5000K D50]
d) PRIMARIES [700/525/450]
e) Monitor [Profile created in Step 1]
f) Display using monitor compensation [Check on]
g) Preview [OFF]
2) CMYK SET UP:
a) ICC [Check on]
b) PROFILE [Can be printer such as DS 8650—]
c) ENGINE [Kodak Digital Science ICC CMS]
d) INTENT [Perceptual]
e) BLACK POINT [OFF]
f) PREVIEW [ON]
3) GRAY SCALE BEHAVIOR:
a) RGB [ON]
b) PREVIEW [ON]
4) PROFILE SET UP:
a) EMBED PROFILES [Check on for all: RGB-CMYK-GRAYSCALF-LAB]
b) ASUMED PROFILES: RGB
c) CMYK [None]
d) GRAYSCALE [None]
e) PROFILE MISMATCH HANDLING
 (i) RGB [Ask when opening]
 (ii) CMYK [Ask when opening]
 (iii) GRAYSCALE [Ask when opening]

2. Create a Tone Scale Calibration Test Target for the Printer

In Adobe Photoshop go to FILE-NEW-RGB and create a set of one-inch square patches of equal RGB code values that vary in 10 code value increments from 0 to 255. A convenient way to do this is to:

A. Set the selection marquee to 1"×1", 300 ppi.

B. Double-click the foreground patch and manually set the RGB values.

C. Press the OPTION-DELETE keys to fill the marquee selected area with the RGB values specified.

D. Make a set of at least 30 patches.

E. SAVE the final test target as an RGB Cal.tif file.

3. Create a Printer-media Profile Using Kodak ColorFlow Software

Follow the Kodak ColorFlow software instructions for creating an ICC profile for the printer and paper of choice.

4. Create a Plurality of Exposure and Tone Scale Correcting Nonlinear Transforms A. Print the test target created in Step 2 using the following steps:

1) Open the test target file created in Step 2. Make sure the test target is still in RGB color space by going to IMAGE-MODE.

2) Send the test target to the printer by first going to FILTER-KICC Conversion in Adobe Photoshop (installed from the Kodak ColorFlow software) and specify Source: sRGB and Destination: the printer-media profile created with Kodak ColorFlow software in Step 3 (Create a Printer-media Profile Using Kodak ColorFlow Software).

B. Using a reflection densitometer read the reflection densities of the printed RGB patches and create a table of reflection densities vs. the green code values of the patches.

C. With a digital camera, photograph a scene with a Macbeth ColorChecker and make an exposure series that varies from 2 stops under to two stops over in 1/2-stop increments. For the Kodak DC 260 camera, it is convenient to do this in shaded daylight with fill flash on for all the exposures as this produces data that is the most useful for tone scaling real images captured later with flash, daylight illumination or combinations of both.

D. Open an image from the exposure series in Adobe Photoshop. Double click the eyedropper on the tool bar and set the sample size to 5×5 pixels. Go to WINDOWS-INFO and measure the RGB code values of each of the 6 neutral steps of the Macbeth ColorChecker. Make a table of the G value of each of the 6 steps and call these the INPUT code values.

E. The aim reflection densities in a final print for the six neutral steps of the Macbeth ColorChecker should be:

Step 1—0.06
Step 2—0.18

Step 3—0.30

Step 4—0.65 (most important step to define)

Step 5—1.05

Step 6—1.70

F. From the table created in Step 4B (Create a plurality of exposure and tone scale correcting nonlinear transforms) select the G values that correspond to the Aim Reflection Densities listed above. These will be the OUTPUT code values.

G. In Adobe Photoshop, go to IMAGE-ADJUST-CURVES and construct an INPUT-OUTPUT transform using the INPUT code values obtained for the measured code values in the camera test image from Step 4C (Create a plurality of exposure and tone scale correcting nonlinear transforms) and the OUTPUT values derived from the aim densities in Steps 4E and 4F (Create a plurality of exposure and tone scale correcting nonlinear transforms).

1) In Adobe Photoshop 5.0, this is easily done by going to IMAGE-ADJUST CURVES and clicking on a point on the line, then typing in the input and output values directly. This must be done for each of the six steps.

2) In Adobe Photoshop 4.0, the input/output points must be manually located with the cursor then clicked to fix each of the six points separately.

H. When done, SAVE the resulting transform in the Photoshop folder with a label such as −2.0 to indicate the stop correction that it will make.

I. Repeat Steps 4G–4H (Create a plurality of exposure and tone scale correcting nonlinear transforms) for each 1/2 stop exposure. Each nonlinear transform that is produced by this method is unique to an exposure condition and simultaneously corrects exposure and tone scale for printing the digital image captured by the capture device (such as a digital camera).

J. For convenience and to save time later, it is preferred to save each 1/2 step correction transform as an Adobe Photoshop ACTION item on the keyboard so that a simultaneous exposure and tone scale correction may be made with one simple keystroke over at least a +2.0 to −2.0 stop exposure range. An ACTION item is most easily created by going to WINDOWS-SHOW ACTIONS and clicking on the upper right arrow of the ACTIONS menu.

1) Click on NEW ACTION-ASSIGN A FUNCTION KEY (such as F2).

2) Click RECORD and go through the following steps.

(i) Go to IMAGE-ADJUST-CURVES-LOAD (navigate to Photoshop and click on the saved −2.0 transform, for example)

(ii) Click OK and click on the STOP button at the bottom of the ACTIONS menu. All of these ACTION STEPS will be saved as the keystroke F2.

(iii) Pressing F2 in any Adobe Photoshop imaging session will simultaneously exposure correct and tone scale an image that is two stops underexposed.

(iv) Repeat creating an ACTION item and saved keystroke for each of the 1/2 stop saved transforms created in Step 4J (Create a plurality of exposure and tone scale correcting nonlinear transforms).

5. Selecting the Appropriate Nonlinear Transform for Printing the Image

A. Open the saved digital image in Adobe Photoshop (in 5.0 if a prompt is presented, click [do not convert] because the user should control this step). Neutral balancing of images can be done by a number of different techniques known in the art. For a specific example of a neutral balancing technique, see Galbraith's website at http://www.robgalbraith.com/.

a) Open the image in Adobe Photoshop.

b) Goto IMAGE-ADJUST CURVES.

c) Double-click on the right-hand eyedropper.

d) Click on an area in the scene that should be neutral.

e) Modify the LAB values such that $L^*$ is unchanged and $a^*=b^*=0$ then click OK.

f) Click on the area that was selected in Step d and the entire scene will be neutral balanced to that point in the scene.

B. The images from most Kodak digital cameras will be in sRGB color space. To exposure correct and tone scale the image it should be converted to LAB color space where the tone scale calibration for the printer was done.

C. With an image on the monitor go to WINDOWS-ACTIONS, navigate on the ACTIONS menu and click on the ACTION: srgb2lab and click on the arrow to run this ACTION. The ACTION will prompt a user to enter SOURCE: Navigate to Color Profiles (for the Mac, open Macintosh HD-Select SYSTEM FOLDER-COLORSYNC PROFILES) (for the PC go to WINDOWS-SYSTEM-COLOR) and select the srgb.pf profile. (It may be useful to put this Folder on the Desktop for future reference and easy access). The DESTINATION is also found in the Color Profiles, select: pslabpcs.pf.

D. Click OK and the ICC conversion should take place.

E. A visual evaluation of the image on the monitor, which has been adjusted to be a good predictor of the final image, can now be made to determine if it is acceptable or unacceptable. The displayed image could be unacceptable because it is either too dark (underexposed) or too light (over exposed).

1) If the image looks acceptable (normal), press the Function key saved as an ACTION item that applies the normal transform. [As an example, the function keys may be set as follows. (F2=−2.0) (F3=−1.5) (F4=−1.0) (F5=−0.50) (F6=N) (F7=+0.50) (F8=+1.0) (F9=+1.5) (F10=+2.0)]

2) If the image on the monitor looks too dark, press one of the Function keys with a Negative (−) correction to improve the visual look.

3) If the image on the monitor looks too light, press one of the Function keys with a Positive (+) correction to improve the visual look.

4) If the appearance on the monitor is not acceptable, select EDIT-UNDO or Command Z (Mac) or Ctrl Z (PC).

F. At first, try a number of the Function keys followed by an UNDO until the visual effect that looks most pleasing is obtained on the calibrated monitor. If none of the Function key corrections look just right, apply the Function keystroke that gives the best look, then go to IMAGE-ADJUST-CURVES and click on the center point of the line and drag it up or down, left or right to make a minor adjustment to fine tune the final image.

6. Color Correcting the Transformed Digital Image

The following procedure permits a user to produce a new digital image, which is corrected for exposure, tone scale, neutral balance and color reproduction when printed on the selected printer.

A. To print the final image, it must have a printer-media profile applied. This is most easily done using FILTER-Kodak ICC Conversion in Adobe Photoshop.

B. The program will ask for a SOURCE which is: srgb and a DESTINATION which is: the printer-media ICC profile created using the Kodak ColorFlow software or one supplied with the printer by the manufacturer. At this point, Adobe Photoshop applies these two profiles to produce a corrected digital image for printing.

C. Send the converted image to the printer making sure that the color management of the printer is turned off.

7. Repeating the Process if the Print is Unacceptable

After the print is made and, in the event that it is unacceptably light or dark, repeat the procedures starting with Step 5 (Selecting the Appropriate Nonlinear Transform for Printing the Image) and select the appropriate Function key to correct for images that are too light or too dark.

Transforms made in accordance with the present invention can be stored in a computer readable storage medium. The computer readable storage medium may comprise, for example; magnetic storage media such as magnetic disc (such as a floppy disc) or magnetic tape; optical storage media such as optical disc, optical tape drive, or machine readable bar code; solid state electronic storage devices such as random access memory (RAM), or read only memory (ROM); or any other physical device or medium employed to store a computer program.

The invention has been described in detail with reference to certain preferred embodiments thereof, but it will be understood that variations and modifications can be effected within the spirit and scope of the invention.

PARTS LIST 10 calibrate monitor
12 calibrate printer
14 create printer-media profile
16 create printer transform
18 select appropriate transform
20 acceptability check
22 apply printer-media profile to transformed image
24 print image
26 computer
28 characterization target
30 printer
32 printed characterization target
34 spectrophotometer
36 saved printer-media profile
40 CIELAB test target
42 CIELAB printed test target
44 reflection densitometer
46 plot of reflection density vs. code values
48 aim densities vs. code values
50 image capture test target (Macbeth ColorChecker)
52 image capture device (digital camera)
54 map input to aim code value
56 saved transform
58 apply saved transform and view
60 subject
62 optimized image

What is claimed is:

1. A method for correcting for exposure in a digital image which was captured by an image capture device and which is to be printed on a printer which forms monochrome or color images, on a medium, comprising the steps of:
   a) providing a plurality of exposure and tone scale correcting transforms, each such transform being unique to an exposure condition and which corrects exposure and tone scale for a digital image captured by the capture device for such unique exposure conditions and to be printed by the printer; and
   b) selecting the appropriate transform from the plurality of transforms and using such selected transform to transform the digital image and produce a new digital image which is corrected for exposure and tone scale when printed from the printer.

2. A method for correcting for exposure in a digital image which was captured by an image capture device and which is to be printed on a printer which forms monochrome or color images, on a medium, comprising the steps of:
   a) providing a plurality of exposure and tone scale correcting nonlinear transforms, each such nonlinear transform being unique to an exposure condition and which corrects exposure and tone scale for a digital image captured by the capture device for such unique exposure conditions and to be printed by the printer; and
   b) selecting the appropriate nonlinear transform from the plurality of nonlinear transforms and using such selected transform to transform the digital image and produce a new digital image which is corrected for exposure and tone scale when printed from the printer.

3. A method for correcting for exposure in a digital image which was captured by an image capture device and which is to be printed on a printer which forms monochrome or color images, on a medium, comprising the steps of:
   a) providing a plurality of exposure and tone scale correcting nonlinear transforms, each such nonlinear transform being unique to an exposure condition and which corrects exposure and tone scale for a digital image captured by the capture device for such unique exposure conditions and to be printed by the printer;
   b) selecting a nonlinear transform from the plurality of nonlinear transforms and using such selected transform to transform the digital image and produce a new digital image which is corrected for exposure and tone scale when printed from the printer; and
   c) repeating step b) until a user acceptable print is produced.

4. A method for correcting for exposure in a digital image which was captured by an image capture device and which is to be printed on a printer which forms monochrome or color images, on a medium, comprising the steps of:
   a) providing a plurality of exposure and tone scale correcting nonlinear transforms, each such nonlinear transform being unique to an exposure condition and which corrects exposure and tone scale for a digital image captured by the capture device for such unique exposure conditions and to be printed by the printer;
   b) selecting a nonlinear transform from the plurality of nonlinear transforms and using such selected transform to transform the digital image;
   c) correcting the transformed digital image to produce a new digital image which is corrected for exposure, tone scale, neutral balance and color reproduction when printed from the printer;
   d) using the printer to print the color corrected transform digital image by the printer; and
   e) repeating steps b), c), and d) until a user acceptable print is produced.

5. The method of claim 4 wherein the image capture device is a digital camera and the medium is a thermal print medium.

6. The method of claim 4 wherein the printer is an ink jet printer.

7. The method of claim 4 wherein the printer is an electrophotographic printer.

8. A computer program product comprising a computer readable storage medium, including a transform made by the steps of:
   a) providing a plurality of exposure and tone scale correcting nonlinear transforms, each such nonlinear transform being unique to an exposure condition and which corrects exposure and tone scale for a digital image captured by the capture device for such unique exposure conditions and to be printed by the printer; and
   b) selecting the appropriate nonlinear transform from the plurality of nonlinear transforms and using such selected transform to transform the digital image and produce a new digital image which is corrected for exposure and tone scale when printed from the printer.

* * * * *